(12) United States Patent
Lertola

(10) Patent No.: US 7,504,174 B2
(45) Date of Patent: Mar. 17, 2009

(54) UNITIZED MEMBRANE ELECTRODE ASSEMBLY AND PROCESS FOR ITS PREPARATION

(75) Inventor: James Gerard Lertola, Avondale, PA (US)

(73) Assignee: E. I. du Pont de Nemours & Company, Wilmington, DE (US)

( * ) Notice: Subject to any disclaimer, the term of this patent is extended or adjusted under 35 U.S.C. 154(b) by 888 days.

(21) Appl. No.: 10/498,030

(22) PCT Filed: Jan. 22, 2003

(86) PCT No.: PCT/US03/01796

§ 371 (c)(1), (2), (4) Date: Jun. 7, 2004

(87) PCT Pub. No.: WO03/063280

PCT Pub. Date: Jul. 31, 2003

(65) Prior Publication Data

US 2005/0255372 A1    Nov. 17, 2005

(51) Int. Cl.
*H01M 2/08*     (2006.01)
*H01M 8/10*     (2006.01)
*B29C 45/14*    (2006.01)
*C25B 13/00*    (2006.01)

(52) U.S. Cl. .............. 429/36; 429/30; 429/42; 204/296; 264/272.11; 264/272.21

(58) Field of Classification Search .......... 429/30, 429/35, 36, 42; 264/272.11, 272.21; 204/296
See application file for complete search history.

(56) References Cited

U.S. PATENT DOCUMENTS

| | | | | |
|---|---|---|---|---|
| 3,064,069 A * | 11/1962 | Augè | ............... | 264/272.21 X |
| 4,749,598 A * | 6/1988 | Miles | ............... | 264/272.11 X |
| 5,705,104 A * | 1/1998 | Trublowski et al. | ......... | 264/1.25 |
| 6,110,333 A * | 8/2000 | Spethmann et al. | ...... | 204/296 X |
| 6,187,468 B1 * | 2/2001 | Shinkai et al. | ............... | 429/42 |
| 6,387,557 B1 * | 5/2002 | Krasij et al. | ............... | 429/35 X |
| 6,475,656 B1 * | 11/2002 | Koschany et al. | .......... | 429/35 X |

FOREIGN PATENT DOCUMENTS

DE          197 03 214     * 11/1998

* cited by examiner

*Primary Examiner*—Stephen J. Kalafut

(57) ABSTRACT

The invention provides a unitized membrane electrode assembly having a first gas diffusion backing having sealing edges; a polymer membrane; a second gas diffusion backing having sealing edges; a first electrocatalyst coating composition present at the interface of the first gas diffusion backing and the polymer membrane; a second electrocatalyst coating composition present at the interface of the second gas diffusion backing and the polymer membrane; and a thermoplastic polymer, fluid impermeable, seal, wherein the thermoplastic polymer is impregnated into the sealing edges of the first and second gas diffusion backings, and the seal envelops a peripheral region of both the first and second gas diffusion backings and the polymer membrane.

33 Claims, 5 Drawing Sheets

UNITIZED MEMBRANE ELECTRODE ASSEMBLY AND PROCESS FOR ITS PREPARATION

FIELD OF THE INVENTION

This invention relates to a membrane electrode assembly for use in electrochemical cells and more particularly to thermoplastic, fluid impermeable seals for the membrane electrode assembly. Further, the invention relates to a process for preparing unitized membrane electrode assemblies providing high productivity.

BACKGROUND OF THE INVENTION

A variety of electrochemical cells falls within a category of cells often referred to as solid polymer electrolyte ("SPE") cells. An SPE cell typically employs a membrane of a cation exchange polymer that serves as a physical separator between the anode and cathode while also serving as an electrolyte. SPE cells can be operated as electrolytic cells for the production of electrochemical products or they may be operated as fuel cells.

Fuel cells are electrochemical cells that convert reactants, namely fuel and oxidant fluid streams, to generate electric power and reaction products. A broad range of reactants can be used in fuel cells and such reactants may be delivered in gaseous or liquid streams. For example, the fuel stream may be substantially pure hydrogen gas, a gaseous hydrogen containing reformate stream, or an aqueous alcohol, for example methanol in a direct methanol fuel cell (DMFC). The oxidant may, for example, be substantially pure oxygen or a dilute oxygen stream such as air.

In SPE fuel cells, the solid polymer electrolyte membrane is typically perfluorinated sulfonic acid polymer membrane in acid form. Such fuel cells are often referred to as proton exchange membrane ("PEM") fuel cells. The membrane is disposed between and in contact with the anode and the cathode. Electrocatalysts in the anode and the cathode typically induce the desired electrochemical reactions and may be, for example, a metal black, an alloy or a metal catalyst supported on a substrate, e.g., platinum on carbon. SPE fuel cells typically also comprise a porous, electrically conductive sheet material that is in electrical contact with each of the electrodes, and permit diffusion of the reactants to the electrodes. In fuel cells that employ gaseous reactants, this porous, conductive sheet material is sometimes referred to as a gas diffusion backing and is suitably provided by a carbon fiber paper or carbon cloth. An assembly including the membrane, anode and cathode, and gas diffusion backings for each electrode, is sometimes referred to as a membrane electrode assembly ("MEA"). Bipolar plates, made of a conductive material and providing flow fields for the reactants, are placed between a number of adjacent MEAs. A number of MEAs and bipolar plates are assembled in this manner to provide a fuel cell stack.

In fabricating unitized MEAs, multilayer MEAs may be prepared and then cut to the required size. In this process, stray fibers from the electrically conductive electrode material may bridge across the thin membrane, interconnecting the electrodes that could result in short-circuiting in an operating fuel cell. Conventional MEAs have also been made that incorporate a membrane having a larger surface area than the electrode layers, with at least a small portion of the membrane extending laterally beyond the edge of the electrode layers. This prevents short-circuiting between the electrodes around the edge of the membrane. However, in MEA fabrication, this poses a problem because the membrane and the electrode layers have to be cut separately resulting in a slow-down of the manufacturing process and loss of productivity.

Another route to fabricating a unitized membrane electrode assembly described in U.S. Pat. No. 6,057,054, in particular, relies on the use of curable or thermosetting sealing materials. Thermosetting materials are materials that, once heated, react irreversibly so that subsequent applications of heat and pressure do not cause them to soften and flow. In this case, a rejected or scrapped piece cannot be ground up and remolded.

The chemical nature of thermosetting materials may lead to undesirable process and product attributes in the fuel cell application. Such materials often require a relatively long time period for chemical reaction to solidify them; they are commonly used for low-volume parts manufacture, where fast cycle times are not important. Reacting components in thermosetting materials may generate undesirable gaseous emissions, requiring forced ventilation of the production area, raising environmental issues, and forming bubbles in the solidified part. The chemical nature and reactivity of residual low-molecular-weight components in thermosetting materials present the possibility of contamination of the membrane or catalyst in a fuel cell. Further, unreacted chemical functional groups in the thermosetting materials provide likely sites for corrosion or other attack by the acidic species in the fuel cell environment.

A further deficiency of thermosetting materials, as implied in the description above, is the inability to repair or recycle a defective part. Such a problem can significantly hurt the economics of manufacture, as the yield loss of the valuable MEA contributes strongly to manufacturing cost.

Physical properties of thermosetting materials are also often insufficient for durable fuel cell operation. Many lack mechanical toughness, and low-modulus forms such as natural rubber require very precise control of stack pressure to assure the desired MEA thickness when assembled.

Finally, the processing of curable resins introduces difficulties in fabrication of the unitized MEA. The relatively low viscosity of the uncured material makes it difficult to control and limit its flow into the porous diffusion backings. Excessive flow can seal off part of the expensive catalyst layers, rendering it inactive. In some cases, a raised dike as described in U.S. Pat. No. 6,057,054 is necessary to mitigate this problem. Quite importantly, thermosetting materials generally do not solidify during the flow process but remain fluid throughout until the flow is stopped and the cure progresses significantly. This causes the flow to be relatively uniform, leaving the MEA components in essentially the same positions they were in before the introduction of the resin. When a short circuit is present before introduction of the resin, as from portions of the electrode layers that inadvertently straddle the membrane, it remains sealed in place after fabrication.

A need exists for polymers useful sealant materials for MEAs that do not have the problems associated with thermosetting resins described above.

SUMMARY OF THE INVENTION

In a first aspect, the invention provides a membrane electrode assembly comprising:

(a) a first gas diffusion-backing having sealing edges;

(b) a polymer membrane;

(c) a second gas diffusion-backing having sealing edges;

(d) a first electrocatylst coating composition present at the interface of the first gas diffusion backing and the polymer membrane;

(e) a second electrocatalyst coating composition present at the interface of the second gas diffusion backing and the polymer membrane; and (f) a thermoplastic polymer, fluid impermeable seal, wherein the thermoplastic polymer is impregnated into the sealing edges of the first and second gas diffusion backings, and the seal envelops a peripheral region of both the first and second gas diffusion backings and the polymer membrane.

Thermoplastic polymers are "materials that soften and flow upon application of pressure and heat."

In a second aspect, the invention provides a process of preparing a membrane electrode assembly comprising:

(a) forming a multilayer sandwich comprising a first gas diffusion backing having sealing edges; a first electrocatalyst coating composition; a polymer membrane; a second electrocatalyst coating composition; and a second gas diffusion backing having sealing edges; and (b) applying a thermoplastic polymer to the multilayer sandwich whereby the thermoplastic polymer is impregnated into the sealing edges of the first and second gas diffusion backings, and the thermoplastic polymer envelops a peripheral region of both the first and second gas diffusion backings and the polymer membrane to form a unitized membrane electrode assembly having a thermoplastic polymer, fluid impermeable seal.

In the second aspect, the invention also provides a process wherein application of the thermoplastic polymer is by injection molding or compression molding.

DETAILED DESCRIPTION OF THE INVENTION

Figure 1:
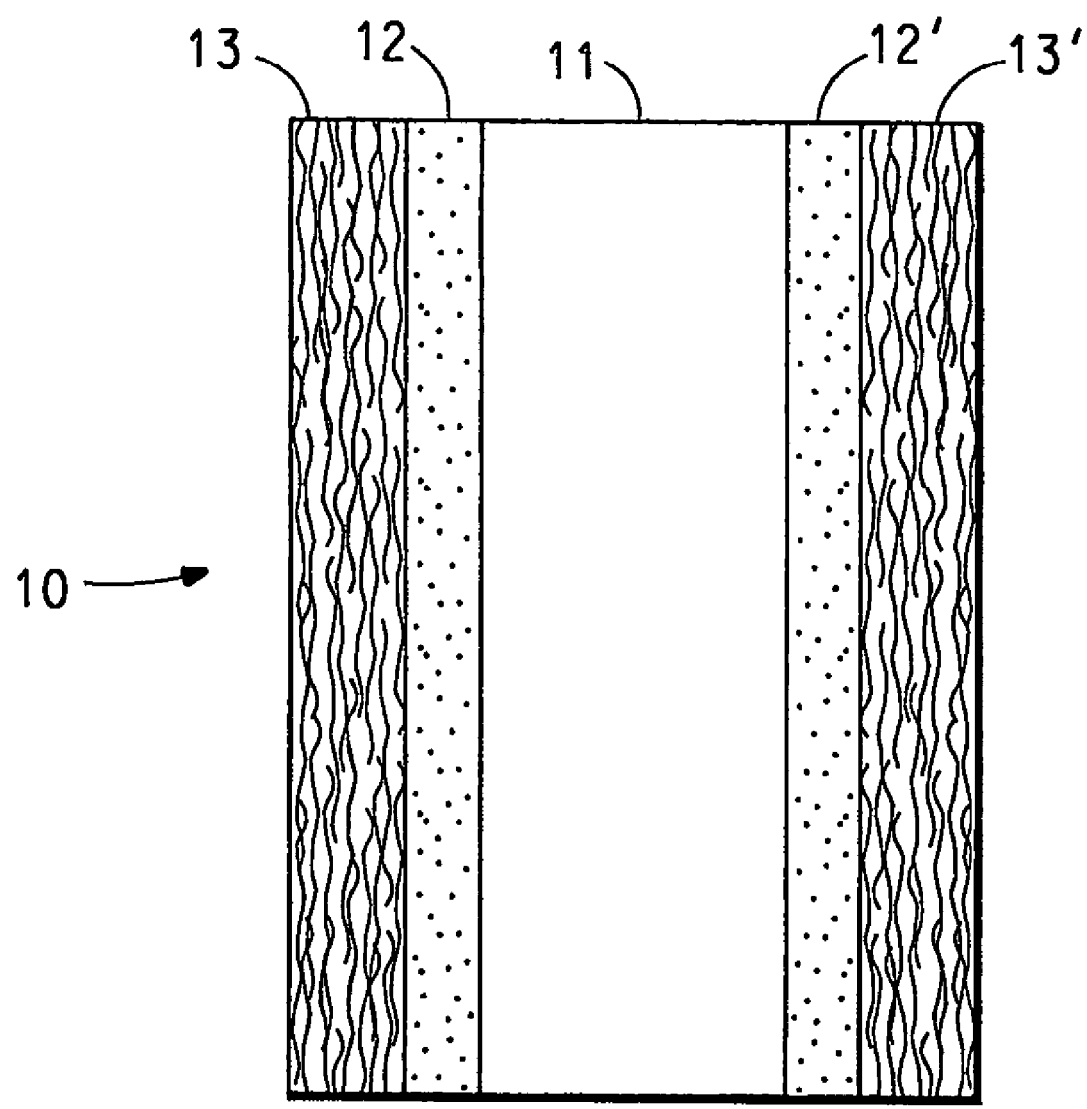
FIG. 1 is a schematic illustration of a multilayer sandwich (10) comprising a first gas diffusion backing having sealing edges (13); a first electrocatalyst coating composition (12); a polymer membrane (11); a second electrocatalyst coating composition (12'); and a second gas diffusion backing having sealing edges (13') used to form the membrane electrode assembly (MEA).

The unitized MEA is prepared using a multilayer sandwich (10), shown in FIG. 1, comprising a first gas diffusion backing having sealing edges (13); a first electrocatalyst coating composition (12); a polymer membrane (11); a second electrocatalyst coating composition (12'); and a second gas diffusion backing having sealing edges (13'). The unitized MEA also comprises a thermoplastic polymer, fluid impermeable seal (14) shown in FIG. 4, wherein the thermoplastic polymer is impregnated into the sealing edges of the first and second gas diffusion backings (13) and (13'), and the seal envelops a peripheral region of both the first and second gas diffusion backings (13) and (13'), and the polymer membrane (11).

Gas Diffusion Backing:

The gas diffusion backings having sealing edges (13) and (13') include a porous electrically conductive material, typically having an interconnected pore or void structure. Typically, the sealing edge of the gas diffusion backing is the cut edge. The electrically conductive material typically comprises a corrosion-resistant material such as carbon, which may be formed into fibers. Such fibrous carbon structures may be in the form of a paper, woven fabric, or nonwoven web. Alternatively, the electrically conductive material may be in particle form. Mixtures of the fibrous carbon structures and the electrically-conductive material in particle form are also useful The electrically-conductive material may further be optionally surface-treated to either increase or decrease its surface energy, allowing it to have either increased or decreased hydrophobicity.

A binder is optionally used to provide the structure with desired mechanical properties such as strength or stiffness. The binder itself may be chosen to serve the additional purpose of a surface treatment as mentioned above.

A microporous composition may also be optionally included with one or both of the gas diffusion backings. This composition may be located on one or both surfaces of the gas diffusion backing or impregnated into it or both. It serves, among other purposes, to afford electrical and/or fluid contact on a fine scale with the electrocatalyst coating. It may further enhance the ability of the gas diffusion backing to permit two-phase fluid flow during fuel cell operation, such as shedding liquid water in the cathode oxidant stream or shedding carbon dioxide bubbles in the anode stream of a direct-methanol fuel cell. It typically comprises electrically conductive particles and a polymeric component. The particles may be, for example, high-structure carbon black such as Vulcan® XC72 manufactured by Cabot Corporation, or acetylene carbon black. The polymeric component may be, for example, a fluoropolymer such as Teflon® polytetrafluoroethylene manufactured by DuPont.

First and Second Electrocatalyst Coating Compositions:

The electrocatalyst coating compositions (12) and (12') include an electrocatalyst and an ion exchange polymer; the two coating compositions may be the same or different. The ion exchange polymer may perform several functions in the resulting electrode including serving as a binder for the electrocatalyst and improving ionic conductivity to catalyst sites. Optionally, other components are included in the composition, e.g., PTFE in particle form.

Electrocatalysts in the composition are selected based on the particular intended application for the catalyst layer. Electrocatalysts suitable for use in the present invention include one or more platinum group metal such as platinum, ruthenium, rhodium, and iridium and electroconductive oxides thereof, and electroconductive reduced oxides thereof. The catalyst may be supported or unsupported. For direct methanol fuel cells, a $(Pt\text{---}Ru)O_x$ electocatalyst has been found to be useful. One particularly preferred catalyst composition for hydrogen fuel cells is platinum on carbon, for example, 60-wt % carbon, 40-wt % platinum, obtainable from E-Tek Corporation of Natick, Mass. These compositions when employed accordance with the procedures described herein, provided particles in the electrode which are less than 1 µm in size.

Since the ion exchange polymer employed in the electrocatalyst coating composition serves not only as binder for the electrocatalyst particles but also may assist in securing the electrode to the membrane, it is preferable for the ion exchange polymers in the composition to be compatible with the ion exchange polymer in the membrane. Most preferably, exchange polymers in the composition are the same type as the ion exchange polymer in the membrane.

Ion exchange polymers for use in accordance with the present invention are preferably highly fluorinated ion-exchange polymers. "Highly fluorinated" means that at least 90% of the total number of univalent atoms in the polymer are fluorine atoms. Most preferably, the polymer is perfluorinated. It is also preferred for use in fuel cells for the polymers to have sulfonate ion exchange groups. The term "sulfonate ion exchange groups" is intended to refer to either sulfonic acid groups or salts of sulfonic acid groups, preferably alkali metal or ammonium salts. For applications where the polymer is to be used for proton exchange as in fuel cells, the sulfonic acid form of the polymer is preferred. If the polymer in the electrocatalyst coating composition is not in sulfonic acid form when used, a post treatment acid exchange step will be required to convert the polymer to acid form prior to use.

Preferably, the ion exchange polymer employed comprises a polymer backbone with recurring side chains attached to the backbone with the side chains carrying the ion exchange groups. Possible polymers include homopolymers or copolymers of two or more monomers. Copolymers are typically formed from one monomer which is a nonfunctional monomer and which provides carbon atoms for the polymer backbone. A second monomer provides both carbon atoms for the polymer backbone and also contributes the side chain carrying the cation exchange group or its precursor, e.g., a sulfonyl halide group such a sulfonyl fluoride ($—SO_2F$), which can be subsequently hydrolyzed to a sulfonate ion exchange group. For example, copolymers of a first fluorinated vinyl monomer together with a second fluorinated vinyl monomer having a sulfonyl fluoride group ($—SO_2F$) can be used. Possible first monomers include tetrafluoroethylene (TFE), hexafluoropropylene, vinyl fluoride, vinylidine fluoride, trifluoroethylene, chlorotrifluoroethylene, perfluoro (alkyl vinyl ether), and mixtures thereof. Possible second monomers include a variety of fluorinated vinyl ethers with sulfonate ion exchange groups or precursor groups which can provide the desired side chain in the polymer. The first monomer may also have a side chain that does not interfere with the ion exchange function of the sulfonate ion exchange group. Additional monomers can also be incorporated into these polymers if desired.

Especially preferred polymers for use in the present invention include a highly fluorinated, most preferably perfluorinated, carbon backbone with a side chain represented by the formula $—(O—CF_2CFR_f)_a—O—CF_2CFR'_fSO_3H$, wherein $R_f$ and $R'_f$ are independently selected from F, Cl or a perfluorinated alkyl group having 1 to 10 carbon atoms, a=0, 1 or 2. The preferred polymers include, for example, polymers disclosed in U.S. Pat. No. 3,282,875 and in U.S. Pat. Nos. 4,358,545 and 4,940,525.

The electrocatalyst coating or catalyst layer may be formed from a slurry or ink. The liquid medium for the ink is one selected to be compatible with the process of application. The inks may be applied to the membrane by any known technique to form a catalyst-coated membrane. Alternately, the inks may be applied to the gas diffusion backing. Some known application techniques include screen, offset, gravure, flexographic or pad printing, or slot-die, doctor-blade, dip, or spray coating. It is advantageous for the medium to have a sufficiently low boiling point that rapid drying of electrode layers is possible under the process conditions employed. When using flexographic or pad printing techniques, it is important that the composition not dry so fast that it dries on the flexographic plate or the cliché plate or the pad before transfer to the membrane film.

A wide variety of polar organic liquids or mixtures thereof can serve as suitable liquid media for the ink. Water in minor quantity may be present in the medium if it does not interfere with the printing process. Some preferred polar organic liquids have the capability to swell the membrane in large quantity although the amount of liquids the electrocatalyst coating composition applied in accordance with the invention is sufficiently limited that the adverse effects from swelling during the process are minor or undetectable. It is believed that solvents with the capability to swell the polymer membrane can provide better contact and more secure application of the electrode to the membrane. A variety of alcohols are well suited for use as the liquid medium.

Preferred liquid media include suitable C4 to C8 alkyl alcohols including, n-, iso-, sec- and tert-butyl alcohols; the isomeric 5-carbon alcohols, 1, 2 - and 3-pentanol, 2-methyl-1-butanol, 3-methyl, 1-butanol, etc., the isomeric 6-carbon alcohols, e.g. 1-, 2-, and 3-hexanol, 2-methyl-1-pentanol, 3-methyl-1-pentanol, 2-methyl-1-pentanol, 3-methyl, 1-pentanol, 4-methyl-1-pentanol, etc., the isomeric C7 alcohols and the isomeric C8 alcohols. Cyclic alcohols are also suitable. Preferred alcohols are n-butanol and n-hexanol. Most preferred is n-hexanol.

If the polymer in the electrocatalyst coating composition is not in sulfonic acid form when used, a different liquid medium may be preferred in the ink. For example, if the one of the preferred polymers described above has its sulfonated groups in the form of sulfonyl fluoride, a preferred liquid medium is a high-boiling fluorocarbon such as "Fluorinert" FC-40 manufactured by 3M.

Handling properties of the ink, e.g. drying performance, can be modified by the inclusion of compatible additives such as ethylene glycol or glycerin up to 25% by weight based on the total weight of liquid medium.

It has been found that the commercially available dispersion of the acid form of the perfluorinated sulfonic acid polymer, sold by E.I. du Pont de Nemours and Company under the trademark Nafion®, in a water/alcohol dispersion, can be used, as starting material, for the preparation of an electrocatalyst coating composition suitable for use in flexographic or pad printing.

In the electrocatalyst coating composition, it is preferable to adjust the amounts of electrocatalyst, ion exchange polymer and other components, if present, so that the electrocatalyst is the major component by weight of the resulting electrode. Most preferably, the weight ratio of electrocatalyst to ion exchange polymer in the electrode is about 2:1 to about 10:1.

Utilization of the electrocatalyst coating technique in accordance with the process of the present invention can produce a wide variety of printed layers which can be of essentially any thickness ranging from very thick, e.g., 20 μm or more very thin, e.g., 1 μm or less. This full range of thickness can be produced without evidence of cracking, loss of adhesion, or other inhomogenieties. Thick layers, or complicated multi-layer structures, can be easily achieved by utilizing the pattern registration available using flexographic or pad printing technology to provide multiple layers deposited onto the same area so that the desired ultimate thickness can be obtained. On the other hand, only a few layers or perhaps a single layer can be used to produce very thin electrodes. Typically, a thin layer ranging from 1 to 2 μm may be produced with each printing with lower % solids formulations The multilayer structures mentioned above permit the electrocatalyst coating to vary in composition, for example the concentration of precious metal catalyst can vary with the distance from the substrate, e.g. membrane, surface. In addition, hydrophilicity can be made to change as a function of coating thickness, e.g., layers with varying ion exchange polymer EW can be employed. Also, protective or abrasion-resistant top layers may be applied in the final layer applications of the electrocatalyst coating.

Composition may also be varied over the length and width of the electrocatalyst coated area by controlling the amount applied as a function of the distance from the center of the application area as well as by changes in coating applied per pass. This control is useful for dealing with the discontinuities that occur at the edges and corners of the fuel cell, where activity goes abruptly to zero. By varying coating composition or plate image characteristics, the transition to zero activity can be made gradual. In addition, in liquid feed fuel cells, concentration variations from the inlet to the outlet ports can be compensated for by varying the electrocatalyst coating across the length and width of the membrane.

Polymer Membrane:

A polymer membrane (11), for use in accordance with the invention, can be made of the same ion exchange polymers discussed above for use in the electrocatalyst coating compositions. The membranes can be made by known extrusion or casting techniques and have thickness which can vary depending upon the application and typically have a thickness of about 350 µm or less. The trend is to employ membranes that are quite thin, i.e., about 50 µm or less. The process in accordance with the present in invention is well-suited for use in forming electrodes on such thin membranes where the problem associated with large quantities of solvent during coating are especially pronounced. While the polymer may be in alkali metal or ammonium salt form during the flexographic or pad printing process, it is preferred for the polymer in the membrane to be in acid form to avoid post treatment acid exchange steps. Suitable perfluorinated sulfonic acid polymer membranes in acid form are available under the trademark Nafion® by E.I. du Pont de Nemours and Company. Alternatively, membranes made from a variety of other ion-conducting polymers could be used, for example sulfonated polyaromatics as described in World Patent WO 00/15691.

Reinforced perfluorinated ion exchange polymer membranes can also be utilized here. Reinforced membranes can be made by impregnating porous, expanded PTFE (ePTFE) with ion exchange polymer. Expanded PTFE is available under the tradename "Goretex" from W. L. Gore and Associates, Inc., Elkton Md., and under the tradename "Tetratex" from Tetratec, Feasterville Pa. Impregnation of ePTFE with perfluorinated sulfonic acid polymer is disclosed in U.S. Pat. Nos. 5,547,551 and 6,110,333.

Catalyst coated membranes may be prepared by coating opposite sides of the polymer membrane (11) with electrocatalyst coating compositions (12) and (12') to form a catalyst coated membrane prior to the multilayer sandwich (10) being formed. The electrocatalyst coating compositions (12) and (12') may be coated on the polymer membrane (11) using a wide variety of coating techniques. Some include screen-printing, offset printing, gravure printing, flexographic printing, pad printing, slot die coating, doctor blade coating, dip coating or spray coating. The sandwich is then formed by placing the catalyst coated membrane between two separate gas diffusion backings having sealing edges (13) and (13').

Catalyst coated membranes or gas diffusion backings coated with electrocatalyst coating compositions may be provided with post treatments such as calendering, vapor treatment to affect water transport, or liquid extraction to remove trace residuals from any of the above earlier steps. If the membrane dispersion or solution used was the precursor of the highly fluorinated ionomer, after application of the solution or dispersion the sandwich formed may be subjected to a chemical treatment to convert the precursor to the ionomer.

Thermoplastic Polymer:

Thermoplastic polymers are "materials that soften and flow upon application of pressure and heat. Thus, most thermoplastic materials can be remolded many times. The obvious advantage is that a piece that is rejected or broken after molding can be ground up and remolded. In case of a mis-molded part, thermoplastic materials also offer the option of repair through application of heat. Some techniques for this include, for example, contact heating, infrared energy, and ultrasonic welding. The presence of electrical conductors in a fuel cell also offers the possibility of electrical resistance or induction welding to re-melt and re-form a thermoplastic component.

Chemically, thermoplastic processing is essentially inert, with very low emissions and little or no appreciable chemical reaction-taking place. Thus, problems such as environmental impact, worker exposure, and bubble formation in the parts are minimal. Thermoplastics as a class include some of the most chemically inert materials in common usage, such as fluoropolymers and aromatic poly(ether ketone)s. Such polymers are available with extremely low levels of any potential fuel cell contaminants, such as metals, catalysts, and reactive functional groups.

Thermoplastic polymers offer a wide range of physical properties of interest to the fuel cell designer. Semicrystalline forms such as high-density polyethylene and polyvinylidene fluoride have particularly low permeability to gases and liquids, and high mechanical toughness. Many have high compressive moduli, either in the neat or reinforced forms, and so can be used to rigidly support fuel cell stack pressure without significantly changing the MEA thickness. Finally, thermoplastics such as melt-processible fluoropolymers offer very durable electrical properties, including dielectric strength and electrical resistance.

One of the most significant advantages for thermoplastics in this application is their flow properties. In the process of injection molding, the mold and MEA are held below the melt temperature of the injected polymer as it is introduced. The polymer solidifies almost instantly upon contact with these relatively cool surfaces, and additional polymer continues to flow past these areas in the interior of the cavity only. As this material reaches the flow front, it spreads apart, contacts cooler surface, and solidifies there. This phenomenon, referred to as "fountain flow" in polymer-processing literature, offers a unique advantage for thermoplastics in this invention. The spreading-apart effect tends to separate electrodes that were initially in or near short-circuit contact. Further, the rapid solidification on contact with the MEA layers tends to prevent sealing off of the catalyst layers. The electrode-separating action of thermoplastic flow has been clearly seen in the products of this invention through microscopic examination.

The thermoplastic polymers useable in this invention may be from any of a number of classes. Melt-processible fluoropolymers such as DuPont Teflon® FEP 100 and DuPont Teflon® PFA 340 may be used, as well as partially fluorinated polymers, an example being polyvinylidene fluoride such as Kynar® 710 and Kynar Flex® 2801 manufactured by Atofina Chemicals, King of Prussia, Pa. Thermoplastic fluoroelastomers such as Kalrez® and Viton®, manufactured by E. I. Du Pont de Nemours & Company, Inc., Wilmington, Del., also fall into this class. Aromatic condensation polymers such as polyaryl(ether ketone)'s, an example being polyaryl(ether ketone) manufactured by Victrex Manufacturing Limited, Lancashire, Great Britain; modified polyolefins such as Bynel® 40E529 and Bynel® 50E561, both manufactured by DuPont; polyolefins such as Sclair® 2318polyethylene manufactured by NOVA Chemicals Corporation, Calgary, Alberta, Canada; thermoplastic elastomers such as Hytrel® (DuPont); liquid-crystal polymers such as Zenite® liquid-crystal polyester (DuPont), and aromatic polyamides such as Zytel® HTN (DuPont) can also be used. For some applications, blends of two or more of these thermoplastic polymers may be used.

The thermoplastic polymer may also be optionally reinforced with fibers or inorganic fillers. Such reinforcements can reduce warpage and increase the stiffness and strength of the seal in the final unitized MEA.

Process for Preparing the Unitized Membrane Electrode Assembly:

Several different techniques may be used to form the unitized MEA. Some examples include injection and compression molding as shown in FIGS. 2 through 7.

Figure 3:
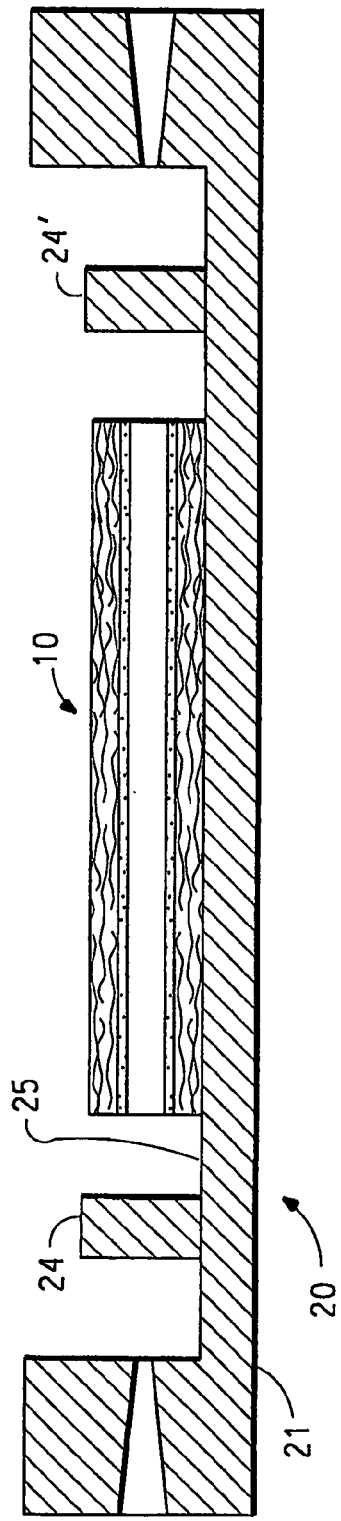
FIG. 3 schematic illustration of a typical injection-molding tool showing the positioning of the multilayer sandwich (10).
Figure 8:
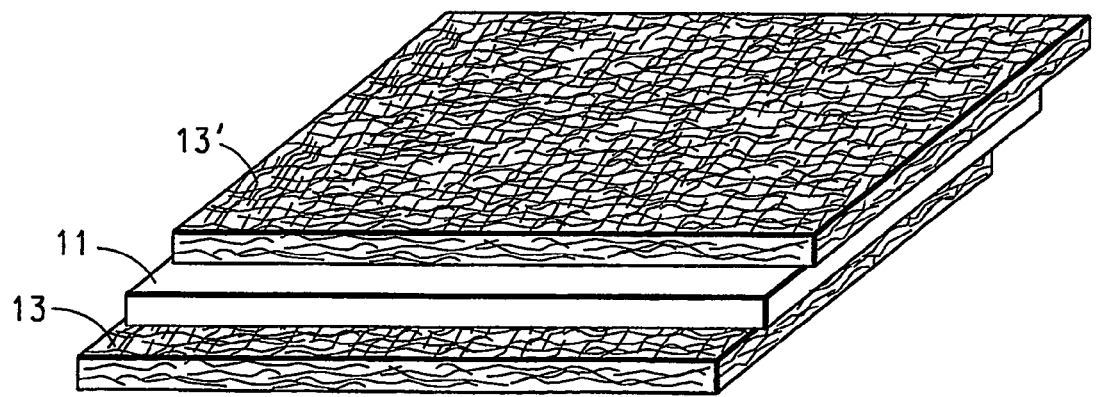
FIG. 8 is a schematic illustration of a skewed MEA lay-up.

The components forming the multilayer sandwich may all be the same size or they may be of different sizes. Typically, for injection molding, the components are the same size or the CCM or membrane may be undersized. The component layers may be placed directly on top of each other as shown in FIG. 3, or they may be positioned as shown in FIG. 8 so there is no overlap at the corners. This dislocation inhibits shorting when the unitized MEA is assembled as a fuel cell. The sealing edges of the gas diffusion backings may also be beveled to encourage fountain flow of the thermoplastic polymer. Typically, in compression molding, the CCM or membrane is longer than the gas diffusion backings.

Figure 2:
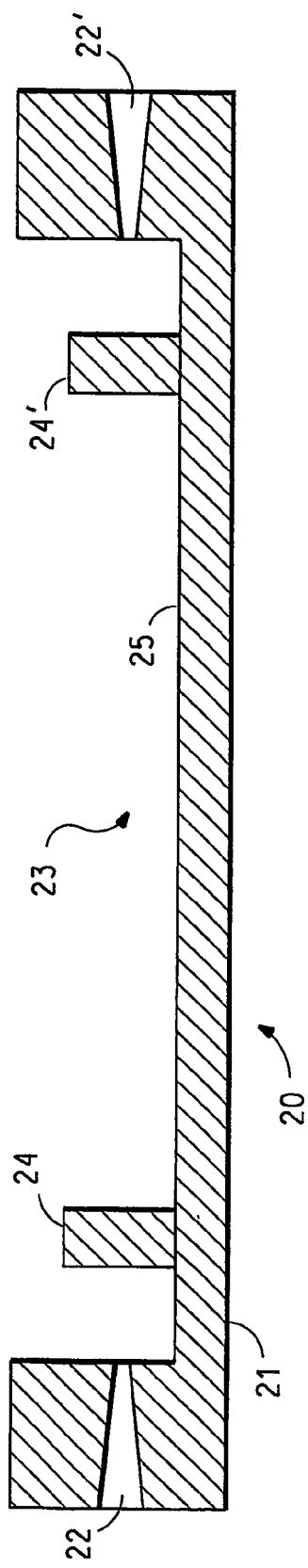
FIG. 2 is a schematic illustration of a typical injection molding tool (20) for preparing an MEA.

Injection Molding:

As shown in FIG. 2, the injection molding tool (20) comprises a lower tool (21) having injection ports (22) and (22'), a mold cavity (23) in which the multilayer sandwich is placed, and optionally posts or other shaped features (24) and (24'). The injection ports (22) and (22') may be located at different points at the end or top of the lower tool (21) with the proviso that the thermoplastic polymer can be easily delivered to its desired location. Typically, the injection ports (22) and (22') are located at the end of the lower tool (21) as shown, and preferably between the lower and top tool for ready ejection of the sprue formed with the product part. The injection molding tool (20) is at a temperature below the melting point of the polymer to allow for quick solidification of the thermoplastic polymer to form the seals (14) and (14') shown in FIG. 4. The central surface (25) of the lower tool (21) within the mold cavity (23) may have a rough texture or be provided with spikes to hold the diffusion backing in place. A top tool (26), shown in FIG. 4 completes the injection molding tool (20). The top tool (26) may also be provided with a rough texture or with spikes in its central area to hold the diffusion backing in place.

The multilayer sandwich (10) that is held in the mold cavity (23) comprises a first gas diffusion backing having sealing edges (13); a first electrocatalyst coating composition (12); a polymer membrane (11); a second electrocatalyst coating composition (12'); and a second gas diffusion backing having sealing edges (13'). Typically, the electrocatalyst coating compositions (12) and (12') are coated on the polymer membrane to form a catalyst coated membrane (CCM), and the catalyst coated membrane is placed between the gas diffusion backings having sealing edges (13) and (13') to form the multilayer sandwich (10). Alternatively, the gas diffusion backings having sealing edges (13) and (13') may be coated with the electrocatalyst coating compositions (12) and (12') and the coated gas diffusion backings assembled on either side of the polymer membrane with the coated side towards the polymer membrane to form the multilayer sandwich (10). The edge of the multilayer sandwich (10) so formed may be treated to improve wettability or adhesion to the thermoplastic polymer that forms the seal. Useful treating agents depend on the choice of thermoplastic used in molding; they include corona treatment or oxygen plasma for most polymers, or fluoropolymer dispersions for use with thermoplastic fluoropolymers.

As shown in FIG. 3, the multilayer sandwich (10) is positioned in the mold cavity (23) with the first or second gas diffusion backings having sealing edges, (13) or (13') respectively, adjacent the surface (25) of the mold cavity (23). The surface of the mold cavity (25) may be provided with a rough texture or spikes to hold the gas diffusion backing adjacent it in place.

Figure 4:
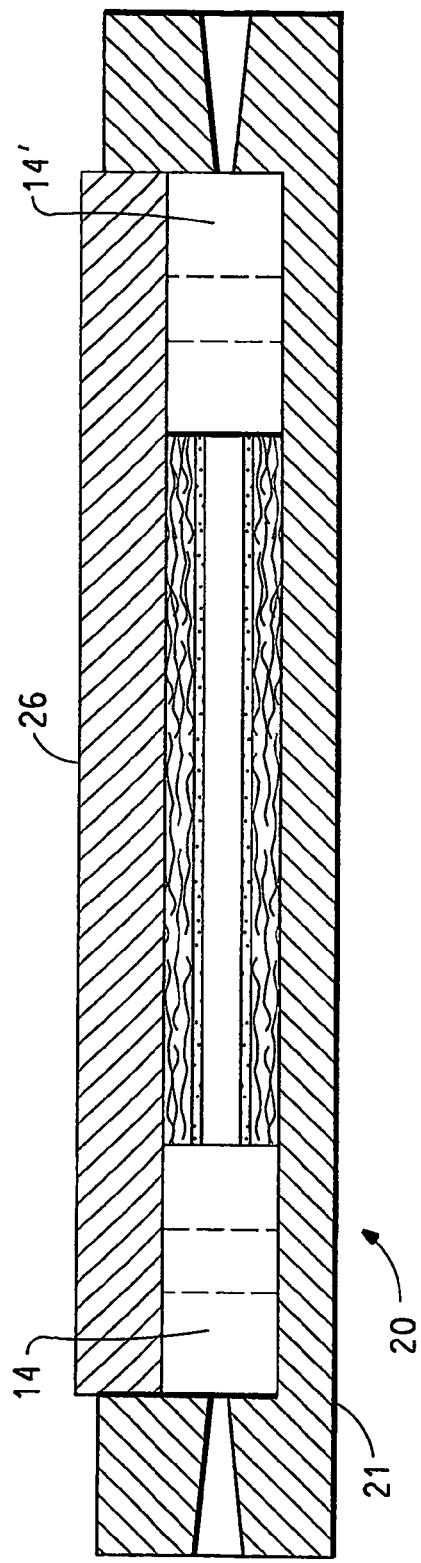
FIG. 4 is a schematic illustration of a typical injection-molding tool showing the multilayer sandwich (10) and the thermoplastic seals formed using injection molding.

As best seen in FIG. 4, a top tool (26) is placed over the multilayer sandwich (10). The surface of the top tool (26) adjacent the multilayer sandwich (10) may be provided with a rough texture or spikes to hold the gas diffusion backing adjacent it in place.

Recesses (not shown) may be provided in the section of the top tool (26) under which the seal is formed. This after injection molding will result in ridges (not shown) on the seals (14) and (14'). Alternately, cross ridges may also be formed that will assist in preventing fluid leakage from the fuel cell formed using the so formed unitized MEAs. The thermoplastic polymer is then injected through injection ports (22) and (22'), and cooled to form seals (14) and (14'). Thus, the thermoplastic polymer is impregnated into the at least a portion of the sealing edges of the first and second gas diffusion backings. The thermoplastic polymer also envelops a peripheral region of both the first and second gas diffusion backings and the polymer membrane to form a fluid impermeable seal.

Figure 5:
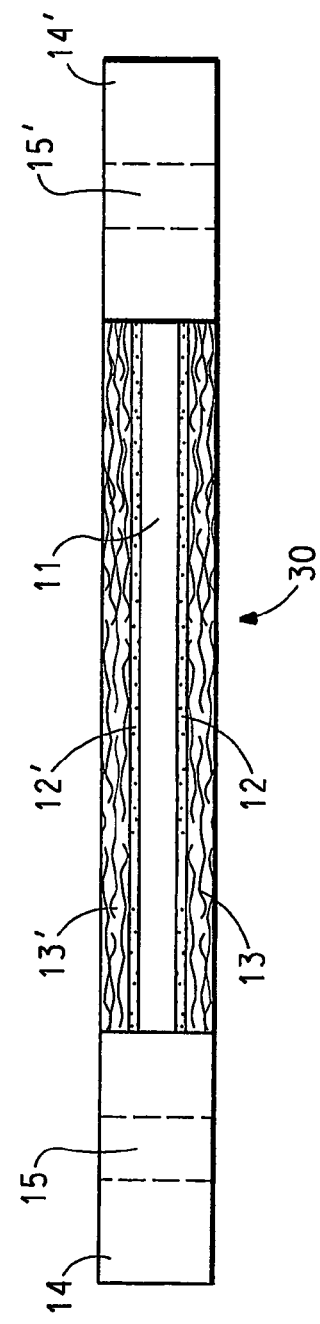
FIG. 5 is a schematic illustration of a unitized MEA (30) after its removal from the injection-molding tool.
Figure 6:
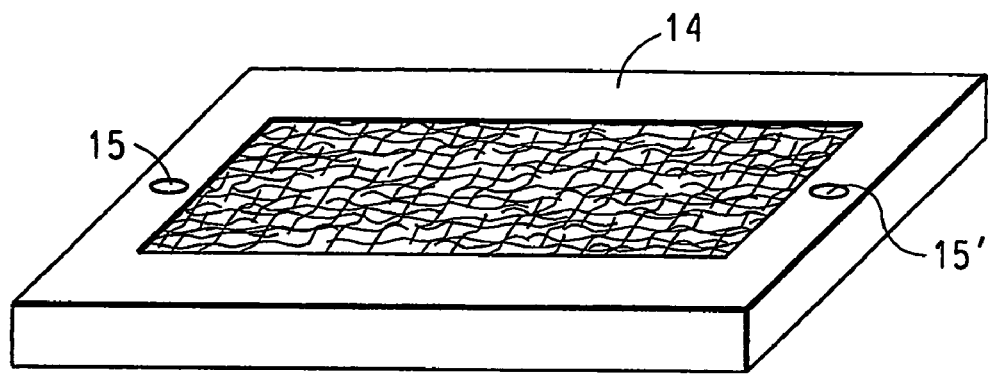
FIG. 6 is a schematic illustration of an oblique view of a unitized MEA (30) after its removal from the injection-molding tool.

After cooling, the unitized MEA (30) so formed, shown in FIGS. 5 and 6, with the thermoplastic polymer, fluid impermeable seals (14) and (14') is removed from the mold cavity (23). As can be easily seen in FIG. 6, openings (15) and (15') are may be present in the seals (14) and (14') to assist in alignment during stack assembly, or to serve as manifolds for passage of fuel, oxidant, or coolant. Other openings where appropriate may also be provided in the unitized MEA using posts (not shown) in the molding tool (20).

Thermoplastic injection molding technology is well-known in the industry and is described in detail in the open literature; an example of a useful injection molding apparatus is given in *Petrothene Polyolefins: A Processing Guide*, $3^{rd}$ Ed., U.S. Industrial Chemicals Co., New York, 1965.

Due to the short distance across the membrane edge, small amounts of conductive material may straddle the membrane and cause short-circuiting in the finished MEA. One way to mitigate this problem is to make the membrane larger than the conductive components, such that it forms an insulating margin all around the periphery of the sandwich. However, the high pressures and flow velocities in injection molding will tend to push the membrane, in this case, up or down against the tooling surface, preventing polymer flow to that side. To prevent this, the peripheral edge of the membrane or catalyst coated membrane is supported by structural features in the tool (not shown) to assist polymer in flowing onto both sides of it. Alternatively, the injection ports or gates on the mold may be relocated and paired up such that the polymer enters the mold just outside the edge of the diffusion backings, on either side of the extended part of the membrane. This would again assure flow of the thermoplastic polymer onto both sides of the membrane and to contact both diffusion backings.

A further refinement of the injection-molding tool is related to gating. Placement of several gates around the periphery of a thin injection-molding cavity can lead to areas where the edge of the sandwich are under high pressure from the polymer before other areas are contacted by the polymer at all. To reduce this effect, part of the peripheral frame area molded around the MEA sandwich may be designed to be thicker than the MEA itself, such that the mold cavity, too, is thicker there. This thick region will tend to fill earlier by the inflowing polymer, and will lead to reduced pressure differences around the edge of the MEA.

Fountain Flow:

As described above, the fountain-flow property of thermoplastic processing can assist in separating the conducting layers from one another in the unitized MEA. This offers the possibility of preparing the membrane or CCM smaller, rather than larger, than the other layers, such that the inflowing polymer undergoing fountain flow can push the conductors apart.

The fountain-flow property of thermoplastic processing is also applicable to other insert molding, encapsulation, or coating processes in which two or more solid parts must be separated from contact. Electrical and electronics applications, in particular, can benefit from this, as they require separation of at least two conducting elements from one another. Such electrical and electronics components can be manufactured by the general process of placing at least one pair of electrical conductors in a mold and applying a thermoplastic polymer to the electrical conductors in such a way that the polymer is directed into at least a portion of the volume between each pair of conductors. Utilizing a fountain-flow pattern of the inflowing polymer can increase the separation between conductors, at least at their peripheral edges.

Thus, in addition to fuel cells, structures such as capacitors, batteries, and multi-conductor insulated wires all can utilize conductors in close proximity to be made by a fountain-flow process, such that they are separated by an insulating polymer. In the case of fuel cells, capacitors, and batteries, an injection molding process could be used. For multi-conductor insulated wires, extrusion would usually be more appropriate.

Compression Molding:

The compression-molding apparatus consists of a mold (40) and a heated press (not shown). The picture-frame mold is fabricated of a material chosen to withstand the elevated temperatures of the process and having high thermal conductivity, typically a metal such as tool steel or aluminum. Metals having American Iron and Steel Institute (AISI) specifications of H-13, H-19, P-4, P-5, and P-6, are useful here. Some additional materials may include 400 series steels such as AISI 410, 416, 420, 431 and 400. Some useful aluminums include Aluminum Association (AA) designations AA 5086, M 5454, AA 2024, and AA 7075.

Figure 7:
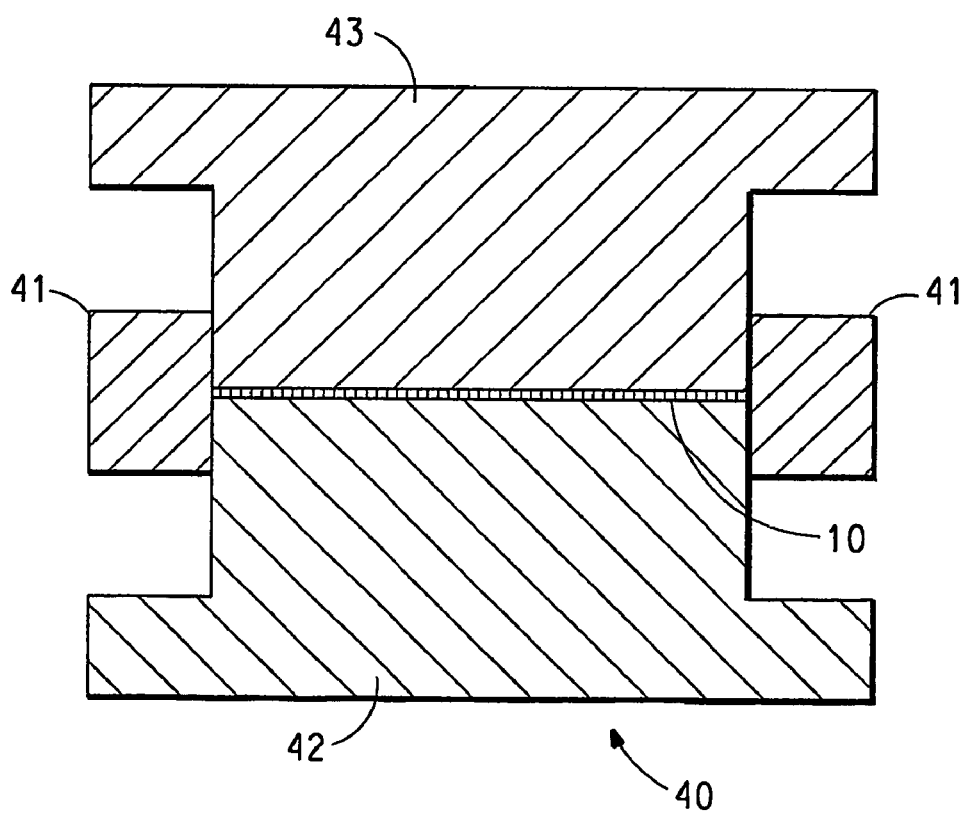
FIGS. 7 and 7A are schematic illustrations of a compression mold (40) used in compression molding showing the positioning of the multilayer sandwich (10).
Figure 7A:
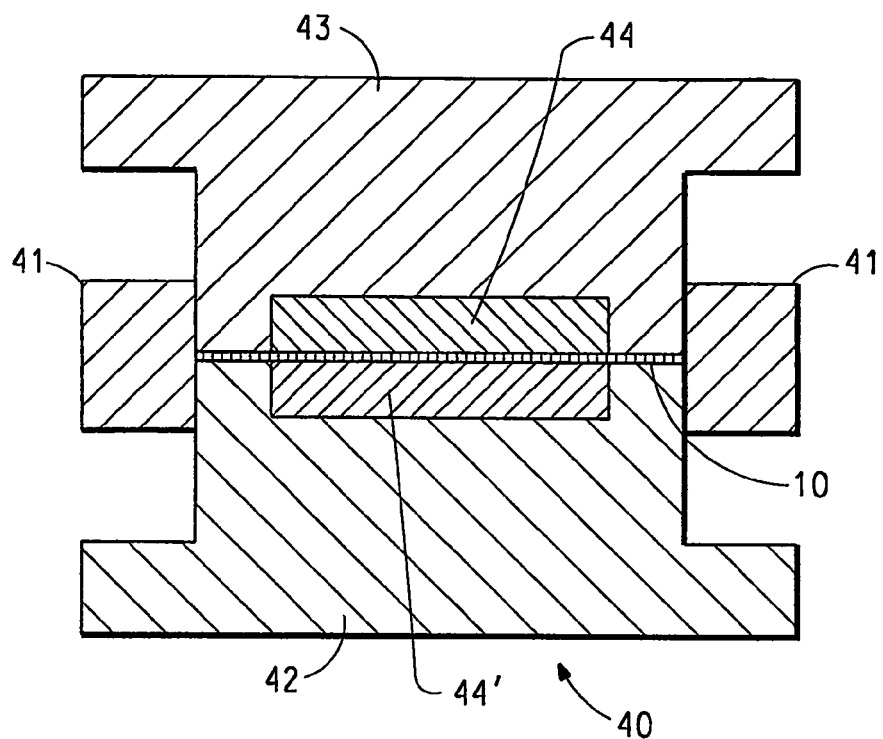

As shown in FIGS. 7 and 7A, the mold (40) generally consists of three parts—a frame part with a hole through its center (41), a bottom plunger (42), and a top plunger (43). The plungers are fabricated to fit snuggly into the frame, and one of the plungers may actually be integral with it. Typically, a hole (not shown) is provided in the frame or plungers where a thermocouple may be inserted for the purpose of monitoring the polymer temperature.

The plungers are typically to be heated and cooled at the same rate in order to minimize warping of the product part. This can be most readily achieved by making their masses essentially equal. Optionally, they may also be kept cooler in their centers than at their periphery. The purpose of this is to keep membranes that are relatively dimensionally unstable at higher temperatures, such as ion-exchange membranes, at a relatively low temperature, to prevent them from degrading or wrinkling. Plungers made with low-thermal conductivity inserts (44) and (44') in their central areas, where they do not contact the thermoplastic polymer, can achieve this, as the center of the mold may be insulated from the heat of the press, and therefore remain at a lower temperature than the metal parts throughout the process. Alternately, the insert may be made up of a plurality of smaller inserts (not shown) with the proviso that the amount of metal kept in contact with the membrane is sufficiently low so warping resulting from the metal contact is minimized. Any material may be used as the insert with the proviso that it keeps the MEA components at a lower temperature. Some useful materials include ceramics selected from the group consisting of alumina, alumina silicate, glass, zirconia, and boron nitride. Some useful ceramic materials may be purchased from Coltronics Corporation, Brooklyn, N.Y., e.g. glass ceramics; Corning, Inc., Corning, N.Y., e.g. ceramics sold under the tradename Macor®; Maryland Lava Company, Street, Md., and Hottec, Inc., Norwich, Conn., e.g. cementous aluminate materials sold under the tradename Fabcram®. Adhesives may be used to bond the inserts in place. Some useful adhesives in fast cure adhesives such as Zircon® adhesives, and the Resbond™ family of adhesives from Cotronics Corporation, Brooklyn, N.Y.

The multilayer MEA sandwich (10) is placed in the center of the bottom plunger (42) with the frame part (41) around it. The plunger may have a release surface or be optionally coated or lined with a release agent, such as PTFE film, to allow easy removal of the part after molding. The CCM or membrane is typically cut to be larger than the gas diffusion backings. Several layers of thermoplastic polymer film are cut to the shape of a frame to surround the gas diffusion backings (13) and (13') but partly overlap the extended portion of the membrane (11 ) all around its perimeter. Alternatively, the thermoplastic polymer may be provided in the form of strips, powder, fibers, fabric, or other easily melted form. The polymer is placed in the mold, above and below the membrane but surrounding the gas diffusion backings. As with the bottom plunger (42), the top plunger (43) may be optionally coated or lined with a release agent, such as PTFE film.

The top plunger (43) of the tool is put in place, fitted into the frame part (41). The tool (40) with the materials within is put in a press, allowed to heat to above the melting point of the polymer, compressed by mechanical action of the press, for example hydraulically, and cooled in place. Any press suitable for heating and melting the thermoplastic seal material may be used in this invention. Some known presses include presses from Carver Inc., Wabash, Ind.; PHI, City Of Industry, Calif.; and Johnson Machinery Company, Bloomfield, N.J. A shim (not shown) may be placed on the frame between the top plunger and the frame to determine the extent to which the MEA components are compressed. If a shim is not used a compression pressure of about 100 to about 1000 psi, more typically a compression pressure of about 300 to about 400 psi may be used. The thermoplastic polymer is preferably heated to just the point of complete melting throughout before cooling is initiated. After the thermoplastic polymer is cooled sufficiently for it to have structural integrity, the part was removed from the tool. The part may also be cooled to lower temperatures if necessary, for example to reduce warpage.

An example of a well-known industrial process of thermoplastic compression molding was the production of phonograph records, which were typically made from compounded polyvinyl chloride. An example of such a process is described in *Principles of Polymer Systems*, 2nd Ed., Ferdinand Rodriguez, McGraw-Hill, New York, 1982.

Fuel Cell:

The unitized MEA (30) may be used to assemble a fuel cell. Bipolar plates (not shown) are positioned on the outer surfaces of the first and second (cathode and anode) gas diffusion backings having sealing edges (13) and (13'). If the seals (14) and (14') are provided with ridges, domes, ribs, or other structural features (not shown), the bipolar plates may be provided with recesses that mesh with these features on the seals (14) and (14'). Since electrolysis cells have fundamentally the same structure as fuel cells, the unitized MEA of this invention may alternatively be used in an electrolysis cell.

Several fuel cells may be connected together, typically in series, to increase the overall voltage of the assembly. This assembly is typically known as a fuel cell stack. Though the typical way to fabricate a stack would be to first make unitized MEA's and then assemble them with bipolar plates to form the stack, it is possible to reverse this sequence. Thus, a stack of un-sealed MEA's could be assembled from a repeating pattern of a bipolar plate, a gas diffusion backing; an electrocatalyst coating composition; a polymer membrane; a second electrocatalyst coating composition; and a second gas diffusion backing; this pattern being repeated at least one time; terminating with a final bipolar plate. Next, the thermoplastic polymer would be applied to this stack whereby the thermoplastic polymer is impregnated into the at least a portion of the sealing edges of the gas diffusion backings, and the thermoplastic polymer envelops a peripheral region of the gas diffusion backings, the polymer membranes, and the bipolar plates to form a thermoplastic polymer, fluid impermeable seal. Such a stack-encapsulation process could generally be performed through injection molding, but in certain cases could be done with compression molding.

Manufacture of the unitized MEA of the invention will be further clarified with reference to the following examples. The examples are merely illustrative and are not intended to limit the scope of the invention.

EXAMPLES

Example 1

A two-part injection-molding tool was fabricated for encapsulation molding of a membrane electrode assembly (MEA) for a PEM fuel cell. The tool was designed to form a cavity with a peripheral frame about 0.18 mm thick and 7.6 cm in diameter, enveloping a square central area about 0.07 mm thick and 51 cm in diameter. Two gates were placed in the center of two opposite edges of the frame.

A three-layer sandwich comprising 0.2-mm-thick Nafion® 117, manufactured by DuPont, Wilmington, Del., between two layers of a carbon-fiber-based diffusion backing, "Sigracet" GDL 10BB manufactured by SGL Carbon Group, Meitingen, Germany, each 0.036 mm thick in their uncompressed state, was placed in the square central area of the molding tool. This sandwich was in essence a "dummy" MEA, in that it only lacked the electrocatalysts necessary for fuel cell function, but could serve mechanically and electrically to work in the same way.

All layers of the sandwich were cut to the same size, about 2 mm larger than the square central area of the tool, such that they extended all around into the thicker frame area of the mold cavity. The tool was at room temperature, approximately 20° C. The tool was closed on the sandwich, slightly compressing it and holding it in place, and then rotated automatically into position in front of an injection-molding extruder. A charge of thermoplastic polymer, Sclair® 79F high-density polyethylene, manufactured by NOVA Chemicals Corporation, Calgary, Alberta, Canada, was injected into the tool and allowed to cool for 10 seconds under packing pressure of 4 MPa. The part was then ejected from the tool using mechanical pins located under the thick frame portion and the sprue area of the tool.

The sandwich components were held together by the thermoplastic polymer seal thus formed. However, the MEA sandwich was not fully encapsulated at its edges, rather it was pushed either against the upper tool (26) or lower tool (21) by the in-flowing polymer. The edge of the membrane was indeed visible around much of the specimen, as the polymer was unable to contact one of the diffusion backing layers at these points. This problem can be eliminated by supporting all components of the MEA within the tool; several means of doing this are discussed in the following examples.

Example 2

A unitized MEA was prepared using the tool and process described in Example 1 with the following exception: The dummy MEA sandwich was cut to be about 1 cm smaller than the square central area of the tool, such that the components did not extend as far as the thicker frame area. This change assured that all components of the MEA were supported within the closed tool, addressing the problem seen in Example 1.

Although the injected polymer was thus geometrically unable to fully encapsulate the edges of the MEA sandwich by flowing above and below it, it appeared to enter the sandwich through the edges at all points. The sandwich components were again found to be held together by the thermoplastic polymer seal thus formed. The membrane was not visible anywhere around the sample, indicating that the polymer was able to contact both diffusion backings all around the sandwich, holding them in place. The frame area being thicker than the area in which the MEA sandwich was supported appeared to help the polymer flow around to all points on the periphery of the sandwich.

The specimen molded by this method was potted in several places in blue-dyed epoxy. The epoxy was a mixture of casting resins with designations 658, and 659 plus 558 hardener, manufactured by Von Roll Isola USA, Inc., Schenectady, N.Y. The formulation was 3 parts 658, 2 parts 558 hardener, and 1 part 659. Blue-pigmented dye was dissolved in the 658 before mixing it with the other components, by heating them together to 50°-60° C. and shaking vigorously for 40 minutes. The dye was Atlasol Blue S (CAS no. 14233-37-5), manufactured by Atlantic Industries, Inc., Nutley, N.J. It was dissolved at a loading of 17 mg per $cm^3$ of 658. The potted specimens were cut into small pieces and microtomed through the area where the injected thermoplastic polymer met the edge of the dummy MEA. Microscopic examination of this specimen showed that the injected polymer completely surrounded the edge of the membrane in many places, but only slightly ingressed into the diffusion backings. This effect would be expected to achieve all the desired characteristics of sealing off the anode and cathode fluids from one another, preventing short-circuiting between the anode and cathode diffusion backings, and mechanically holding the MEA together for easy stack assembly, without covering much of the active catalyst layer.

Example 3

Example 2 was repeated with the following exception: The membrane in the dummy MEA sandwich was cut to be about 0.2 cm larger than the diffusion backings, such that it extended beyond them all around their perimeter.

The sandwich components were held together by the thermoplastic polymer seal thus formed, and it would be expected to have no short-circuiting between the anode and cathode diffusion backings. However, the membrane was not fully encapsulated at its edges, rather it was pushed either against the upper or lower tool face by the in-flowing thermoplastic polymer. The edge of the membrane was visible around nearly the entire specimen, as the thermoplastic polymer was unable to contact one of the diffusion backing layers at these points.

To remedy this problem, supporting structures, such as ribs or domes, may be built into both the top and bottom tool parts around the MEA sandwich. These structures are positioned to pinch the edge of the membrane that extends beyond the diffusion backings in a number of points around its perimeter. This design would allow the thermoplastic polymer to flow onto both sides of the membrane and to therefore contact both diffusion backings. As in Example 3, this would achieve all the desired characteristics of sealing off the anode and cathode fluids from one another, preventing short-circuiting between the anode and cathode diffusion backings, and mechanically holding the MEA together for easy stack assembly.

Alternatively, the injection gates on the mold may be relocated and paired up such that the polymer enters the mold just outside the edge of the diffusion backings, on either side of the extended part of the membrane. This would again assure flow of the thermoplastic polymer onto both sides of the membrane and to contact both diffusion backings.

Example 4

Electrical contacts were placed against both diffusion backings of the specimen prepared in Example 2, and the resistance between them was measured to be greater than 40 Mohm, indicating no short circuit within the unitized MEA (UMEA).

Example 5

Example 2 is repeated with the following exception: the edges of the diffusion backings are first sealed to prevent carbon fibers from straddling the membrane and causing short circuits. This edge seal may be made by any of numerous methods and materials, most preferably, by use of a high-productivity process such as simultaneous application of a bead of sealant or thermoplastic melt and cutting. This would assure that most of the UMEAs, wherein all components are the same size, may be made without short circuits, even if the diffusion backings were cut no smaller than the membrane.

Example 6

Example 2 is repeated with the following exception: All components of the MEA sandwich are positioned in a skewed fashion, as shown in FIG. 8, after flush-cutting all component layers. That is, the membrane is slightly displaced, in a direction not parallel to any of its edges, upon the lower electrode. The upper electrode is likewise slightly displaced in the same direction. In this manner, all locations where the two electrodes would be in close proximity across the membrane edge are eliminated. This embodiment is most preferably used in conjunction with either the membrane-supporting structures or the relocated gating described in Example 4.

Example 7

Example 2 was repeated with the following exception: The Nafion® membrane was replaced by a CCM comprising a 0.05-mm-thick Nafion® 112 membrane coated on both sides with a platinum-based electrocatalyst coating composition layer designed for use in a PEM fuel cell. The electrocatalyst coatings were composed of a proprietary mixture of platinum black and Nafion® ionomer, chosen to be appropriate for strong performance in hydrogen fuel cells. The loadings of platinum were less than 1 $mg/cm^2$ on both electrodes. A number of appropriate compositions are disclosed in U.S. Pat. No. 5,330,860.

The specimen thus made could be used without additional gaskets or seals between the bipolar plates of a fuel cell stack.

Example 8

Example 2 was repeated with the following exception: the dummy-MEA sandwich was replaced with a single thick layer of high-void-fraction diffusion backing, "Technimat" 6100-200, manufactured by Lydall Specialty Engineered Products, Manchester, Conn. The thermoplastic polymer used was Bynel® 40E529 polyethylene-containing seal material, manufactured by DuPont, Wilmington, Del.

The specimen thus made was attached all around its perimeter to the polymer frame. The polymer could be seen through the diffusion backing and had penetrated several hundred microns inward at all points. However, the outside surfaces of the diffusion backing appeared to be polymer-free even at the edges, indicating that all the polymer ingression was close to the central plane of the diffusion backing.

The specimen was prepared and examined by microscopy using the method described in Example 2. In cross-section, it was found that the thermoplastic polymer had indeed flowed only into the center of the diffusion backing, not into the surfaces. Further, the solidified thermoplastic polymer formed a carbon-fiber free wedge, having pushed the upper and lower portions of the diffusion backing apart. This property of thermoplastic flow, dubbed "fountain flow" in the fluid-mechanics literature, is a distinct advantage of the process in that it offers a natural tendency to separate the electrodes from one another. Indeed, further tests using dummy MEA sandwiches showed that the inflowing polymer could to form long wedge-like structures between the first and second gas diffusion backings having sealing edges and/or between the first and second electrocatalyst coatings, separating them with carbon-fiber free polymer to greater distances than before the polymer injection.

The fountain-flow property of thermoplastic processing is also applicable to other insert molding, encapsulation, or coating processes in which a plurality of solid parts must be separated from contact. Electrical and electronics applications, in particular, can benefit from this, as they require separation of at least two conducting elements from one another. Such electrical and electronics components can be manufactured by the general process of placing at least one pair of electrical conductors in a mold and applying a thermoplastic polymer to the electrical conductors in such a way that the polymer is directed into at least a portion of the volume between each pair of conductors. Utilizing a fountain-flow pattern of the inflowing polymer can increase the separation between conductors, at least at their peripheral edges. Thus, in addition to fuel cells, structures such as capacitors, batteries, and multi-conductor insulated wires all can be made by a fountain-flow process, such that they are separated by an insulating polymer. In the case of fuel cells, capacitors, and batteries, an injection molding process could be used. For multi-conductor insulated wires, extrusion would usually be more appropriate.

Example 9

Example 2 was repeated with the following exception: the membrane was cut about 0.3 cm smaller in diameter than the diffusion backings, to take advantage of fountain flow while allowing the diffusion backings to firmly hold the membrane in place. The specimen thus made was attached all around its perimeter to the thermoplastic polymer seal.

Example 10

Example 2 was repeated with the following exception: the gas diffusion backings had been pre-compressed at their edges by manually pressing them down against a flat surface with the edge of a metal strip, to form a somewhat beveled shape. A margin approximately 1 mm wide was compressed along all four edges of the square gas diffusion backings. The beveled face of the diffusion backings was laid up inward in the sandwich, toward the membrane. The purpose of this was to further take advantage of fountain flow while allowing the diffusion backings to firmly hold the membrane in place. The specimen thus made was attached all around its perimeter to the thermoplastic polymer seal.

Example 11

Additional features are applied to the tool and process described in Example 2:

a. The tool is made with a uniform cavity thickness. The diffusion backings are compressed to a strain of 1% to 90%, preferably 10% to 40%, when the tool is closed. They are expected to spring back to some degree after molding, making them stand proud to the seal thus formed. The specimen thus made may be assembled into a fuel cell stack with flat bipolar plates, re-compressing the diffusion backings to a desired strain for good electrical contact.

b. The tool of Example 11a has a cavity thickness which is adjustable, through use of means such as a movable insert backed up by shims of various thickness. This allows it to be used with a variety of CCM and diffusion-backing thickness.

c. The tool of Example 11a has a rough texture in the central area that contacts the diffusion backings. This texture provides the advantage of holding the MEA in place during molding, even if the thermoplastic polymer pressure against the MEA is unbalanced in the process.

d. The tool of Example 11a has short spikes in the central area that contacts the diffusion backings. The spikes are designed to be long enough to penetrate into the fibrous diffusion backings, but are not long enough to pierce the membrane. These spikes provide the advantage of holding the MEA in place during molding, even if the thermoplastic polymer pressure against the MEA is unbalanced in the process.

Example 12

Example 2 is repeated with the following exceptions:

a. The MEA components are cut with a zigzag edge to enhance their bonding to the inflowing polymer.

b. The MEA components are cut with a repeating lobe pattern on their edges to effect a mechanical interlock with the inflowing polymer.

c. The MEA components are made with rough edges to enhance their bonding to the inflowing polymer.

d. The membrane edge is chemically or thermally treated to enhance its wetting by and adhesion to the inflowing polymer.

Example 13

A unitized MEA with thermoplastic seal is made by the process of Example 2. However, the proton-exchange membrane, with or without catalyst coatings, is first dried to low moisture content, under which condition it shrinks in all dimensions. After placing it into a sandwich with the diffusion backings, water in the form of liquid droplets, mist, or humidified gas is introduced to the sandwich, increasing the moisture content of the membrane. Under these conditions, it expands to larger length and width than the diffusion backings, helping to electrically isolate them from one another.

Optionally, the sandwich is held in place near its center with a clamp, weight, magnet, or other force prior to introduction of the water. This may take place within the mold cavity, either before or after the mold is closed.

Example 14

A picture-frame mold was fabricated of tool steel having an American Iron and Steel Institute (AISI) specification of H-13 heat treated to RC 40-44 and manufactured by Carpenter Technology Corporation, Reading, Pa. The mold consisted of three parts—a frame with 7.6-cm-square hole, a 4.1-cm-thick 7.6-cm-square bottom and top plungers. A hole was drilled into one side of the frame where a thermocouple was inserted for the purpose of reading the mold temperature at this interface. Steel shims having equal thickness are placed on opposite sides of the frame between the frame and the top plunger to limit the amount of compression in the MEA. The frame was suspended high enough, using shims, so that its midpoint was near the midpoint of the MEA materials.

A three-layer sandwich comprising 0.2-mm-thick Nafion® 117, DuPont, Wilmington, Del., between two layers of a carbon-fiber-based diffusion backing, "Sigracet" GDL 10AA, manufactured by SGL Carbon Group, Meitingen, Germany, was placed in the center of the bottom plunger atop a 0.08-mm-thick PTFE release film, with the frame part around it. This sandwich was in essence a "dummy" MEA, in that it lacked the electrocatalysts necessary for fuel cell function, but could serve mechanically and electrically to work in the same way.

The membrane had been cut to be about 7 mm larger than the diffusion backings. Several layers of thermoplastic polymer film, Bynel® 40E529 polyethylene-containing seal material, manufactured by DuPont, Wilmington, Del., were die-cut to square dimensions of 7.6 cm outside diameter and 5.1 cm inside diameter; the films thus formed frames that would surround the diffusion backings but partly overlap the extended portion of the membrane all around its perimeter. These layers of polymer were also placed in the mold, above and below the membrane. A second piece of the release film was placed on top of the sandwich.

The top plunger of the tool was put in place, fitted into the frame. The tool with the materials within was placed in a press, allowed to heat to above the melting point of the thermoplastic polymer, compressed hydraulically and cooled in place. Just before cooling, the temperature in the frame was measured to be approximately 185° C., and the set point for the press-platens temperature was 200° C. After the frame temperature was below 60° C., the part was removed from the tool.

The sandwich components were held together by the consolidated thermoplastic polymer seal thus formed. Further, the MEA sandwich was fully encapsulated at its edges; the edge of the membrane was not visible around any of the specimen. The polymer was able to contact and slightly ingress into both of the diffusion backing layers all around their perimeters. The specimen formed was not warped, and the central part of the membrane was smooth and flat, showing no ripples.

Example 15

Example 14 was repeated with the following exception: a CCM comprising a 0.05-mm-thick Nafion® membrane, coated on both sides with a platinum-based catalyst layer, similar to that described in Example 7, was used instead of the membrane alone. This catalyst-coated membrane (CCM) was designed for use in a PEM fuel cell.

The specimen thus made was placed in a hydrogen-fueled test fuel cell and found to generate electric current. A polarization curve was generated for this specimen and found to match that of a similar CCM assembled into a similar cell with traditional gaskets and separate diffusion backings.

Control 1:

A three-layer sandwich comprising 17.15 cm thick Nafion® 117 proton-exchange membrane between two layers of a carbon-fiber-based diffusion backing, "Sigracet" GDL 10AA, manufactured by SGL Carbon Group, Meitingen, Germany, was placed centered between two thick plates of Teflon®D PTFE resin. The sandwich layers were all squares of diameter 5.0 cm, and the plates were squares of diameter about 6 cm. A gap of thickness 0.9 mm was thus available all around the periphery of the sandwich for introducing a thermosetting resin.

A curable flow processable sealant material, RTV 118, which is a thermosetting resin, manufactured by GE, Schenectady, N.Y., was injected into the gap around the perimeter of the sandwich. This material was allowed to cure approximately 16 hours, during which time emissions of acetic acid could be detected by their odor.

The specimen thus molded was removed from the plates, cross-sectioned, and examined by scanning electron microscopy. The sealant material was found to have flowed against the edge of the sandwich, uniformly permeating into the diffusion backings to a depth of 0.2-0.4 mm. The carbon fibers of the diffusion backing were seen to remain in place adjacent to the edge of the membrane; there was no visible evidence of flow-induced separation of the electrodes.

The long solidification time, gaseous emissions, and flow pattern of this Example contrasted sharply with that seen for the thermoplastic resin.

What is claimed is:

1. A unitized membrane electrode assembly comprising:
   (a) a first gas diffusion-backing having sealing edges;
   (b) a polymer membrane;
   (c) a second gas diffusion-backing having sealing edges;
   (d) a first electrocatalyst coating composition present at the interface of the first gas diffusion backing and the polymer membrane;
   (e) a second electrocatalyst coating composition present at the interface of the second gas diffusion backing and the polymer membrane; and
   (f) a thermoplastic polymer, fluid impermeable, seal, wherein the thermoplastic polymer is impregnated into at least a portion of the sealing edges of the first and second gas diffusion backings, and the seal envelops a peripheral region of both the first and second gas diffusion backings and the polymer membrane and wherein the thermoplastic polymer is polyaryl(ether ketone).

2. The unitized membrane electrode assembly of claim 1 wherein the first and second gas diffusion backing having sealing edges comprise a porous electrically conductive material.

3. The unitized membrane electrode assembly of claim 2 wherein first and second gas diffusion backing having sealing edges comprise fibrous carbon structures, particulate carbon or mixtures thereof.

4. The unitized membrane electrode assembly of claim 3 wherein fibrous carbon structures are selected from the group consisting of paper, woven fabric, and nonwoven webs.

5. The unitized membrane electrode assembly of claim 2 wherein the porous electrically conductive material comprises a microporous component.

6. The unitized membrane electrode assembly of claim 5 wherein the microporous component is selected from the group consisting of carbon particles, a polymeric component, and mixtures thereof.

7. The unitized membrane electrode assembly of claim 6 wherein the polymeric component is a fluoropolymer.

8. The unitized membrane electrode assembly of claim 1 wherein the electrocatalyst coating composition comprises an electrocatalyst and an ion exchange polymer.

9. The unitized membrane electrode assembly of claim 8 wherein the ion exchange polymer is a highly fluorinated ion exchange polymer.

10. The unitized membrane electrode assembly of claim 9 wherein the highly fluorinated ion exchange polymer has sulfonate ion exchange groups.

11. The unitized membrane electrode assembly of claim 1 wherein the electrocatalyst coating compositions are applied using screen printing, offset printing, gravure printing, flexographic printing, pad printing, slot die coating, doctor blade coating, dip coating or spray coating.

12. The unitized membrane electrode assembly of claim 1 wherein the polymer membrane is an ion exchange polymer.

13. The unitized membrane electrode assembly of claim 12 wherein the ion exchange polymer is highly fluorinated.

14. The unitized membrane electrode assembly of claim 13 wherein the highly fluorinated ion exchange polymer has sulfonate ion exchange groups.

15. The unitized membrane electrode assembly of claim 1 wherein the polymer membrane is a reinforced perfluorinated ion exchange polymer membrane.

16. A fuel cell comprising the unitized membrane electrode assembly of claim 1.

17. An electrolysis cell comprising the unitized membrane electrode assembly of claim 1.

18. A fuel cell stack comprising a plurality of the unitized membrane electrode assembly of claim 1.

19. A process of preparing a membrane electrode assembly comprising:
   (a) forming a multilayer sandwich comprising a first gas diffusion backing having sealing edges; a first electrocatalyst coating composition; a polymer membrane; a second electrocatalyst coating composition; and a second gas diffusion backing having sealing edges; and (b) applying a thermoplastic polymer by injection molding to the multilayer sandwich whereby the thermoplastic polymer is impregnated into the at least a portion of the sealing edges of the first and second gas diffusion backings, and the thermoplastic polymer envelops a peripheral region of both the first and second gas diffusion backings and the polymer membrane to form a thermoplastic polymer, fluid impermeable, seal, and (c) utilizing an injection molding tool wherein the peripheral edge of the polymer membrane is supported by structural features in the injection molding tool to assist polymer in flowing onto both sides of it.

20. The process of claim 19 wherein the first and second electrocatalyst coating compositions are applied to opposite sides of the polymer membrane to form a catalyst coated membrane prior to forming the multilayer sandwich.

21. The process of claim 19 or 20 wherein membrane or catalyst coated membrane and the first and second gas diffusion backings having sealing edges are all the same size.

22. The process of claim 19 or 20 wherein membrane or catalyst coated membrane is smaller than the first and second gas diffusion backings having sealing edges.

23. The process of claim 19 or 20 wherein the edge of the membrane or catalyst coated membrane is treated to improve wettability or adhesion to the thermoplastic polymer that forms the seal.

24. A process of preparing a membrane electrode assembly comprising:
(a) forming a multilayer sandwich comprising a first gas diffusion backing having sealing edges: a first electrocatalyst coating composition; a polymer membrane; a second electrocatalyst coating composition; and a second gas diffusion backing having sealing edges;
(b) applying a thermoplastic polymer by injection molding to the multilayer sandwich whereby the thermoplastic polymer is impregnated into the at least a portion of the sealing edges of the first and second gas diffusion backings, and the thermoplastic polymer envelops a peripheral region of both the first and second gas diffusion backings and the polymer membrane to form a thermoplastic polymer, fluid impermeable, seal; and
(c) utilizing an injection molding tool wherein the injection molding tool comprises a lower tool with a mold cavity and an upper tool with a central area; and wherein a portion of the surface of the mold cavity of the lower tool or a portion of the surface of the central area of the top tool has a rough texture or spikes.

25. A process of preparing a membrane electrode assembly comprising:
(a) forming a multilayer sandwich comprising a first gas diffusion backing having sealing edges; a first electrocatalyst coating composition; a polymer membrane; a second electrocatalyst coating composition; and a second gas diffusion backing having sealing edges;
(b) applying a thermoplastic polymer by injection molding to the multilayer sandwich whereby the thermoplastic polymer is impregnated into the at least a portion of the sealing edges of the first and second gas diffusion backings, and the thermoplastic polymer envelops a peripheral region of both the first and second gas diffusion backings and the polymer membrane to form a thermoplastic polymer, fluid impermeable, seal; and
wherein a fountain-flow pattern of the inflowing polymer increases the separation between the first and second gas diffusion backings having sealing edges.

26. A process of preparing a multi-conductor electrical component comprising:
(a) placing at least one pair of electrical conductors in a mold; and
(b) applying a thermoplastic polymer to the electrical conductors whereby the thermoplastic polymer is directed into at least a portion of the volume between each pair of conductors, and a fountain-flow pattern of the inflowing polymer increases the separation between each conductor in at least one pair of conductors at the peripheral edges thereof.

27. The process of claim 26 wherein application of the thermoplastic polymer is by injection molding.

28. The process of claim 26 wherein application of the thermoplastic polymer is by extrusion.

29. The process of claim 26, wherein the multi-conductor electrical component is a battery.

30. The process of claim 26, wherein the multi-conductor electrical component is a capacitor.

31. The process of claim 26, wherein the multi-conductor electrical component is a multi-conductor insulated wire.

32. A process of preparing a fuel cell stack comprising:
(a) forming a multilayer sandwich comprising a repeating pattern of a bipolar plate, a first gas diffusion backing having sealing edges; a first electrocatalyst coating composition; a polymer membrane; a second electrocatalyst coating composition; and a second gas diffusion backing having sealing edges; this pattern being repeated at least one time; terminating with a final bipolar plate; and
(b) applying a thermoplastic polymer by injection molding to the multilayer element whereby the thermoplastic polymer is impregnated into the at least a portion of the sealing edges of the gas diffusion backings, and the thermoplastic polymer envelops a peripheral region of the gas diffusion backings, the polymer membranes, and the bipolar plates to form a thermoplastic polymer, fluid impermeable seal;
wherein the peripheral edge of the polymer membrane is supported by structural features in an injection molding tool to assist polymer in flowing onto both sides of it.

33. The process of claim 32, wherein the first and second electrocatalyst coating compositions are applied to opposite sides of the polymer membrane to form a catalyst coated membrane prior to forming the multilayer sandwich.

* * * * *